United States Patent
Jones et al.

(10) Patent No.: US 7,099,375 B2
(45) Date of Patent: Aug. 29, 2006

(54) CHIP RATE INVARIANT DETECTOR

(75) Inventors: Alan Edward Jones, Derry Hill (GB); Steven Nicholas Geers, Tetbury (GB)

(73) Assignee: IPWireless, Inc., San Bruno, CA (US)

( * ) Notice: Subject to any disclaimer, the term of this patent is extended or adjusted under 35 U.S.C. 154(b) by 796 days.

(21) Appl. No.: 10/187,458

(22) Filed: Jul. 1, 2002

(65) Prior Publication Data
US 2003/0067966 A1   Apr. 10, 2003

(30) Foreign Application Priority Data
Jul. 2, 2001   (GB) .................................... 0116181

(51) Int. Cl.
*H04B 1/707* (2006.01)
(52) U.S. Cl. ...................... 375/147; 375/340
(58) Field of Classification Search ............... 375/143, 375/147, 152, 316, 340, 343, 348
See application file for complete search history.

(56) References Cited

U.S. PATENT DOCUMENTS 5,606,580 A * 2/1997 Mourot et al. ............... 375/340
2002/0141366 A1* 10/2002 De et al. ..................... 370/335

* cited by examiner

*Primary Examiner*—Betsy L. Deppe
(74) *Attorney, Agent, or Firm*—Morrison & Foerster LLP (57) ABSTRACT

A chip rate invariant detector (FIG. 2) is used in a wireless spread spectrum high capacity communications system which can accommodate two or more different chip rates. At a higher chip rate the data blocks are segmented into uniform suitable sizes for the detector which has an increased data block length to prevent loss of information to smearing due to effective overlap of segmented data blocks. The resultant data blocks are cut down to standard size by discarding samples and applied to a matched filter for further standard information processing.

21 Claims, 6 Drawing Sheets

FIG. 6 ic samples of the signal. These samples then drop into a buffer 14 which segments the data bursts into lengths appropriate to the ongoing operation of matched filter 17.

CHIP RATE INVARIANT DETECTOR

The present invention is directed to a chip rate invariant detector, especially in the context of a spread spectrum high capacity digital wireless communications system having at least two different radio frequency chip rates.

BACKGROUND OF THE INVENTION

There is disclosed in co-pending U.S. Pat. No. 6,865,169 titled "CELLULAR WIRELESS INTERNET ACCESS SYSTEM USING SPREAD SPECTRUM AND INTERNET PROTOCOL", application Ser. No. 09/432,824, filed Nov. 2, 1999, assigned to the present Applicant, and published in equivalent form as European patent publication EP1098539, a cellular wireless Internet access system which is specifically designed to meet the special and particular requirements of a selected frequency band which has a large amount of available spectrum. As part of the U.S. government requirements for operation in such a system, it must be capable of operating in more than one band or frequency range. For high speed transfer of digital data, of course, the received radio transmission must be digitized. In the above co-pending application, the user has a radio receiving antenna attached to user equipment (UE) which includes conversion means for receiving the wireless radio signal and ultimately transmitting the digital data to the user's personal computer (PC). In addition, the overall wireless system includes a base radio receiving station ('Node B') which again digitizes the radio signal to convey it to a radio network controller (RNC).

In a spread spectrum system as described above, information signal bits are transmitted in a sequence of chips at a particular chip rate dependent upon the characteristics of the particular frequency band in which the system is operating. Thus, the design of the system must accommodate varying chip rates. Moreover, as in the system described above, hundreds of thousands or millions of replications of at least the user equipment (UE) is required. Thus, the design of a receiver, which includes a detector, must be carefully chosen. In other words, there should be low cost and at the same time effective operation.

SUMMARY OF INVENTION

It is therefore an object of the present invention to provide a chip rate invariant detector.

In accordance with the above object, there is provided a spread spectrum high capacity digital wireless communications system having at least two different radio frequency chip rates and a matched filter decoder designed for a standard data block, the system comprising means for receiving and converting a radio analog signal to digital data bursts and means for segmenting the data bursts into standard data block lengths. For the higher chip rate an effective pair of data paths is provided, each with two data block segments, and where segments from respective data paths overlap further including means for increasing the data block size of one of the segments and padding the other overlapped segment to match. Detector means are provided for processing such segments and for accommodating the increased length of the segment data blocks. Means are provided for post processing the signal from the detector means for deleting or discarding sufficient samples of the increased, data block length segments to reduce the data block size to a standard.

Matched filter means responsive to the sample processed signals for decoding the standard data blocks are provided whereby the detector means is invariant to changes in the chip rate and multiple chip rates are seamlessly detected.

DETAILED DESCRIPTION OF PREFERRED EMBODIMENT

Figure 1:
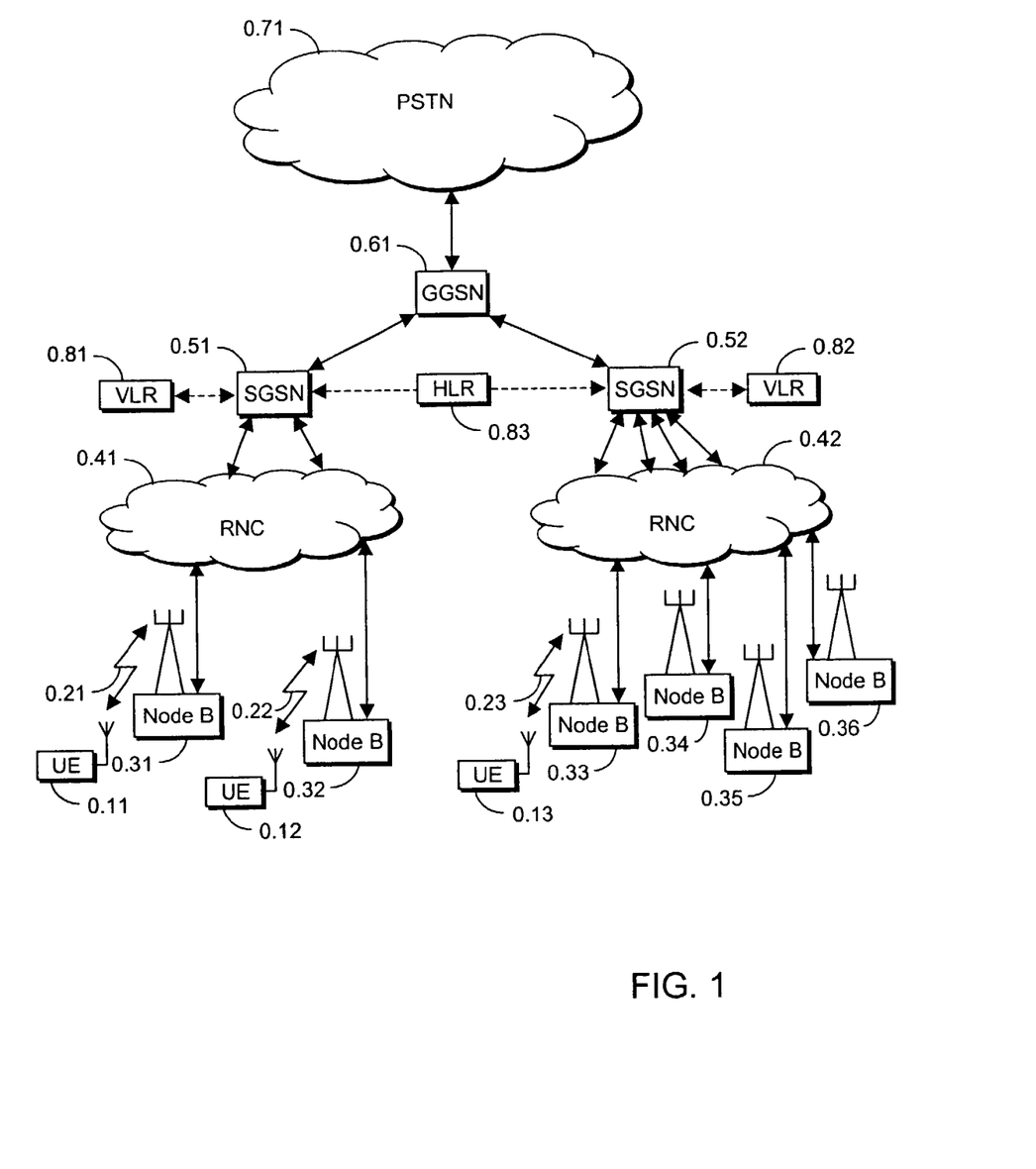
FIG. 1 is a block-schematic diagram of a UMTS system in which the present invention is used.

FIG. 1 shows, in outline, a cellular telephone communication system supporting a Universal Mobile Telecommunications System (UMTS) air-interface in accordance with a preferred embodiment of the invention. The UMTS air interface is being defined by the European Telecommunications Standards Institute (ETSI).

Generally, the air-interface protocol is administered from base transceiver sites that are geographically spaced apart—one base site supporting a cell (or, for example, sectors of a cell).

A plurality of subscriber units (0.11–0.13) (user equipment or 'UE' in UMTS nomenclature) communicate over the selected air-interface 0.21–0.23 with a plurality of base transceiver stations ('Node B' in UMTS nomenclature) 0.31–0.36. A limited number of UEs 0.12–0.13 and Node Bs 0.31–0.36 are shown for clarity purposes only. The Node Bs 0.31–0.36 may be connected to a conventional public-switched telephone network (PSTN) 0.71 through a network core comprising radio network controllers (RNCs) 0.41–0.42, serving GPRS support nodes (SGSNs) 0.51–0.52 and a gateway GPRS support node (GGSN) 0.61. The SGSNs 0.51–0.52 communicate with respective visitor location registers (VLRs) 0.81–0.82 and a central home location register (HLR) 0.83.

Each Node B 0.31–0.36 is principally designed to serve its primary cell or sector thereof, with each Node B 0.31–0.36 containing one or more transceiver units and communicating with the rest of the cellular system infrastructure. Each RNC 0.41–0.42 may control one or more Node Bs 0.31–0.36.

Figure 2:
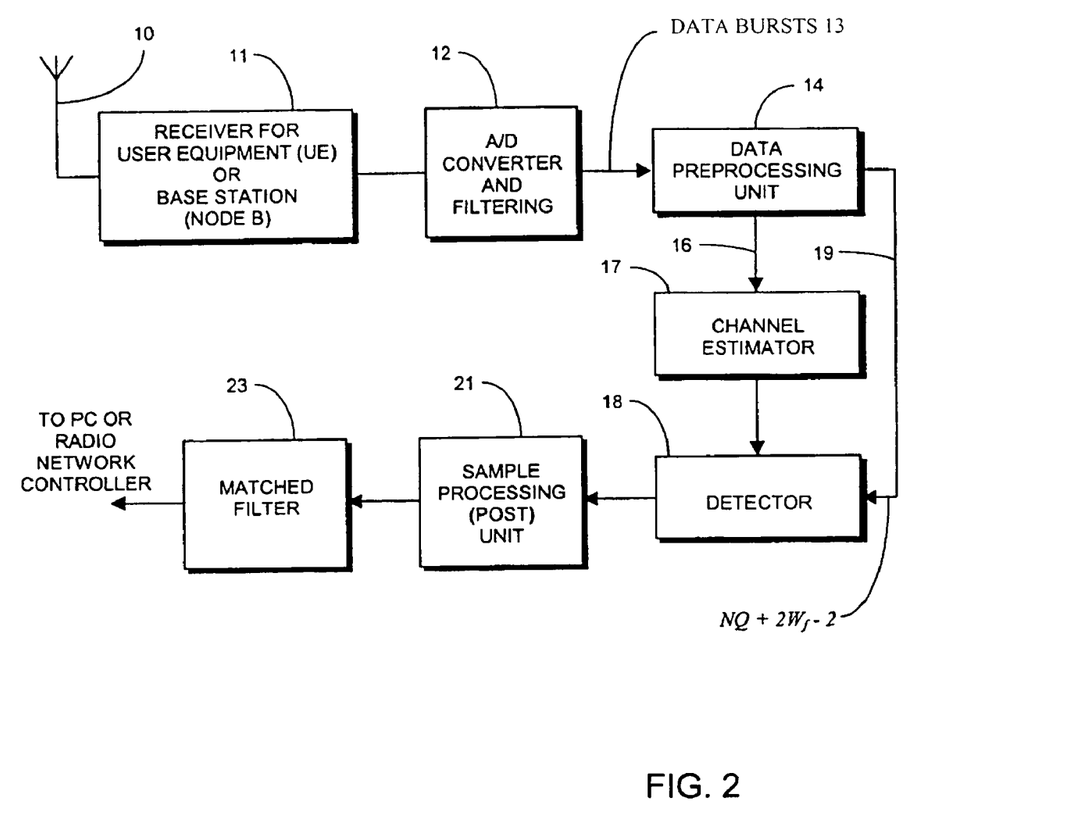
FIG. 2 is a block diagram showing receiver architecture embodying the present invention which may be associated with user equipment (UE) or 'Node B' base station of FIG. 1.

FIG. 2 shows receiver architecture of the present invention which would either be associated with the user equipment (UE) as discussed in the above co-pending application or be a part of a so-called 'Node B' base station as also shown in the above co-pending application. Wireless radio signals are received on antenna 10 and are received by the UE or Node B equipment 11. Then analog to digital conversion 12 takes place and also the type of filtering as disclosed in the infinite impulse response digital lowpass filter of the co-pending application. The output of converter 12 are data bursts 13 which consists of a set of digital samples which approximate the received signal. This is applied to a data pre-processing unit 14 which on line 16 extracts a so-called midamble portion of the received data burst (the spread spectrum technology will be discussed in FIG. 3) which is applied to a channel estimator 17 which in turn applies an estimate of the total channel impulse response to detector 18. Detector 18 also receives the information output of data pre-processing unit 14. The estimate of channel impulse response is used to improve the signal-to-noise ratio of the received signal and is the standard technique in spread spectrum technology.

The outputs of data processing unit 14 on line 19 to detector 18 are data blocks of a uniform size. In any case, it would be of a fixed data block length and is indicated in the context of the present invention as $(NQ+2W_f-2)$ (however, normally in a prior art standard system, this data block would contain $(NQ+W_f-1)$ samples). As discussed above, for simplicity in detector design, it is imperative that the detector response be invariant to multiple chip rates (for example as in the context of the present invention such multiple rates might be 3.84 megachips per second and 7.68 megachips per second; alternatively one of the chip rates might be 1.28 megachips per second, as supported in current proposals for UTRA TDD Mode). The output samples of detector 18 drive a post or sample processing unit 21 where the signal segments are further treated so that matched filter 23 is supplied data blocks of a standard length. The matched filter has filter coefficients defined by the code sequence of interest in the spread spectrum communication system. The output of the matched filter has an information data stream which can then be utilized by either a personal computer or a radio network controller in the wireless Internet system described in the above co-pending application.

Figure 3:
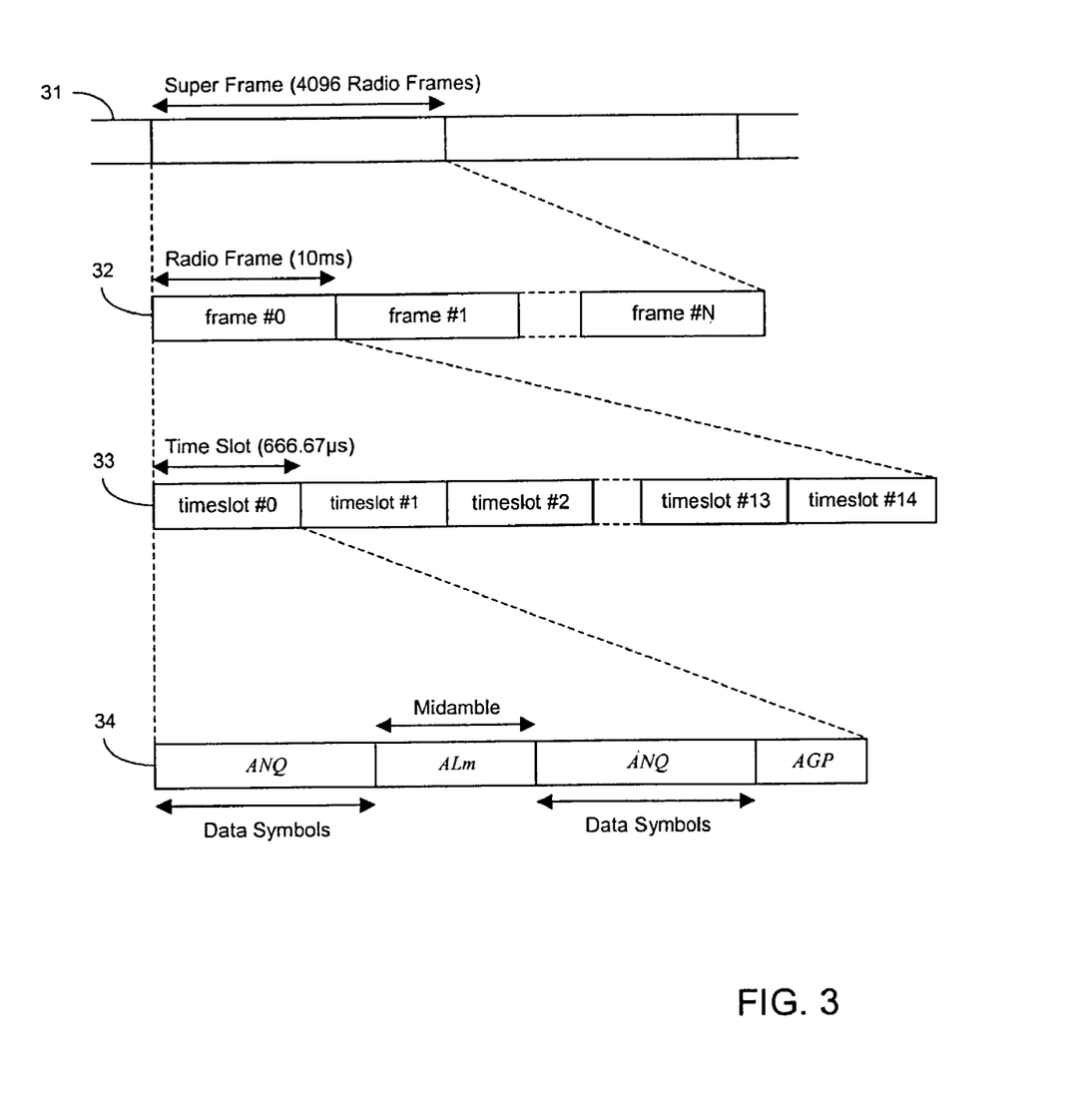
FIG. 3 illustrates a time domain data stream of the radio signal used in the present invention.

FIG. 3 illustrates the framing for a UMTS terrestrial radio access (UTRA) which operates in a time division duplex mode. The time domain framing is illustrated in FIG. 3 for such a system, where a superframe consists of 4096 radio frames. This is shown at 31. Then 32 shows the various radio frames which in turn consist as shown at 33 of 15 time slots. Each time slot has a duration of 666.67 microseconds. Finally, at 34 there is illustrated a data burst which occurs in each time slot. Such data burst is what is applied to the data pre-processing unit 14. This data burst is a standard in the UTRA system discussed above. It consists of two data fields designated ANQ which are symmetrically arranged around the midamble portion designated ALm. Finally, the last field is designated AGP which is a guard. The letter symbols used at 34 for the data burst are defined as follows:

A Taken from the set of positive integers not including 0
N The number of information symbols
Q The spreading factor
Lm Length of the midamble
GP Length of the guard As a practical example, in a wireless communication system operating at a chip rate of 3.84 Mcps, the following typical values would be A=1, N=69, Q=16, Lm=256, GP =96.

Figure 4:
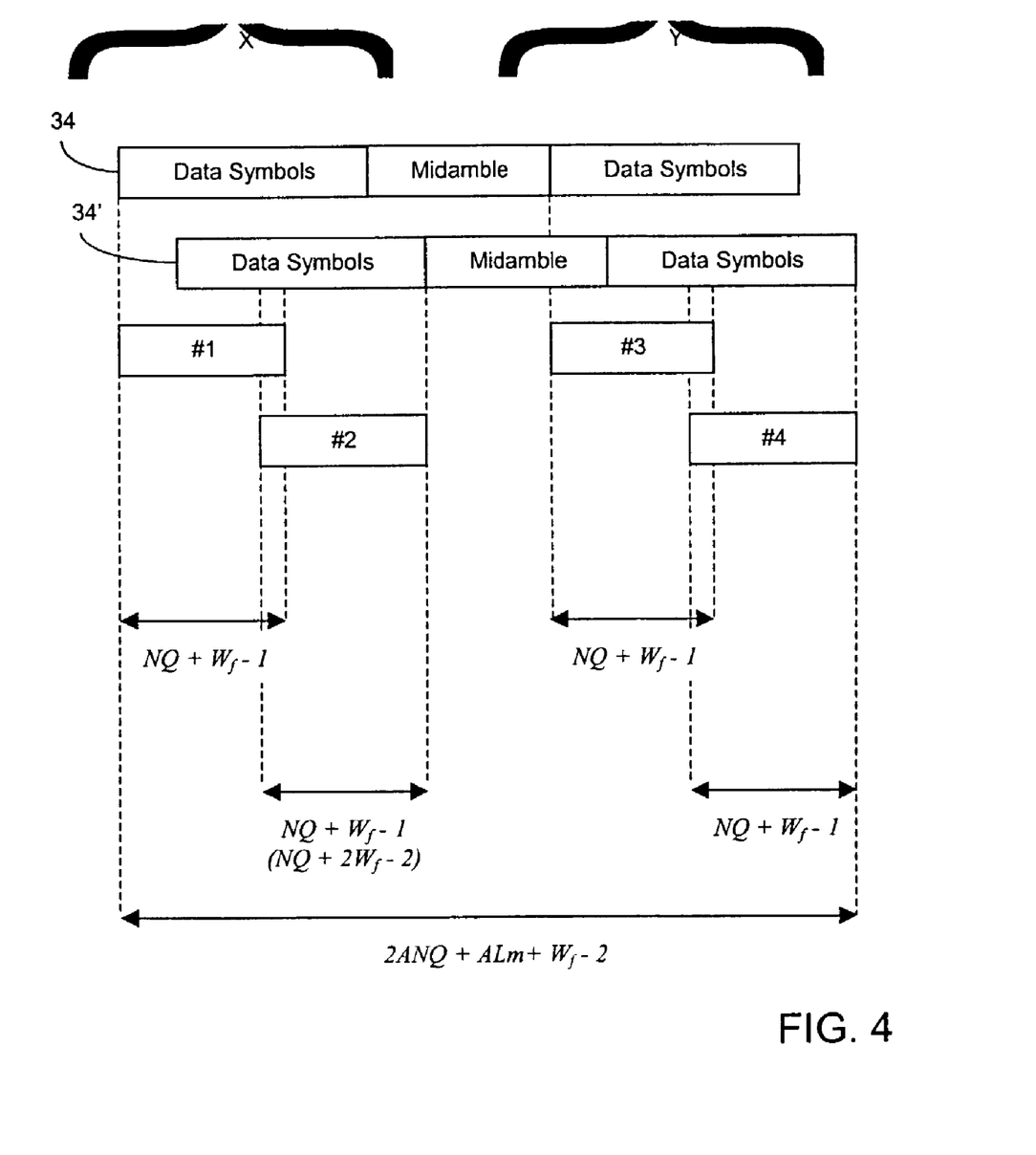
FIG. 4 is a block diagram illustrating the operation of the present invention in spread spectrum.

FIG. 4 illustrates the reception of a burst 34 at a chip rate of 7.68 Mcps (A=2) and the superposition of a delayed burst 34' due to the radio channel impulse response. For clarity the delayed version of the burst is shown separately.

But first referring to the standard technique of handling a data burst 34, again the data symbols and midamble are illustrated as in FIG. 3 where the data payload areas designated X and Y are illustrated by the blocks #1 and #3. This data block is of a standard size for use in the detector 18 (see FIG. 2). The detector normally accepts data blocks of length $(NQ+W_f-1)$ samples and uses blocks of length NQ for the matched filter 23 (again see FIG. 2). The matched filter, in the prior art, then produces a vector of length N which can be handled by the processing equipment in either a personal computer or controller. $W_f$ defines in a spread spectrum system the useful time span from the channel impulse response. Normally, as the chip rate is increased, the number of chips in the data payload area X and Y also increases. The detector is implemented such that it operates on a fixed data block length of nominally $(NQ+W_f-1)$ samples. And this is so indicated. However, if the detector is used at multiple chip rates (as illustrated where one chip rate is double another), the data payload areas X and Y must be segmented into the required size for the detector so when the chip rate is doubled from 3.84 Mcps to 7.68 Mcps (that is A=1 goes to A=2) the number of data blocks will increase as illustrated from 2 to 4. In the example shown in FIG. 4, these are illustrated as consisting of two paths with the channel impulse response which in effect give two data bursts superimposed at the receiver. Specifically, data blocks #1 and #2 are superimposed as are #3 and #4. For clarity they are shown separately in the diagram of FIG. 4. Each data block captures sufficient samples so as to use all of the energy in the channel impulse response. But because of overlapping, each data block requires additional samples to detect all of the information in the detector. With the effective segmentation shown in FIG. 4 to accommodate the higher chip rate (the detector has been effectively designed for the lower chip rate), FIG. 5 illustrates the degradation because of missing information which will normally take place.

Figure 5:
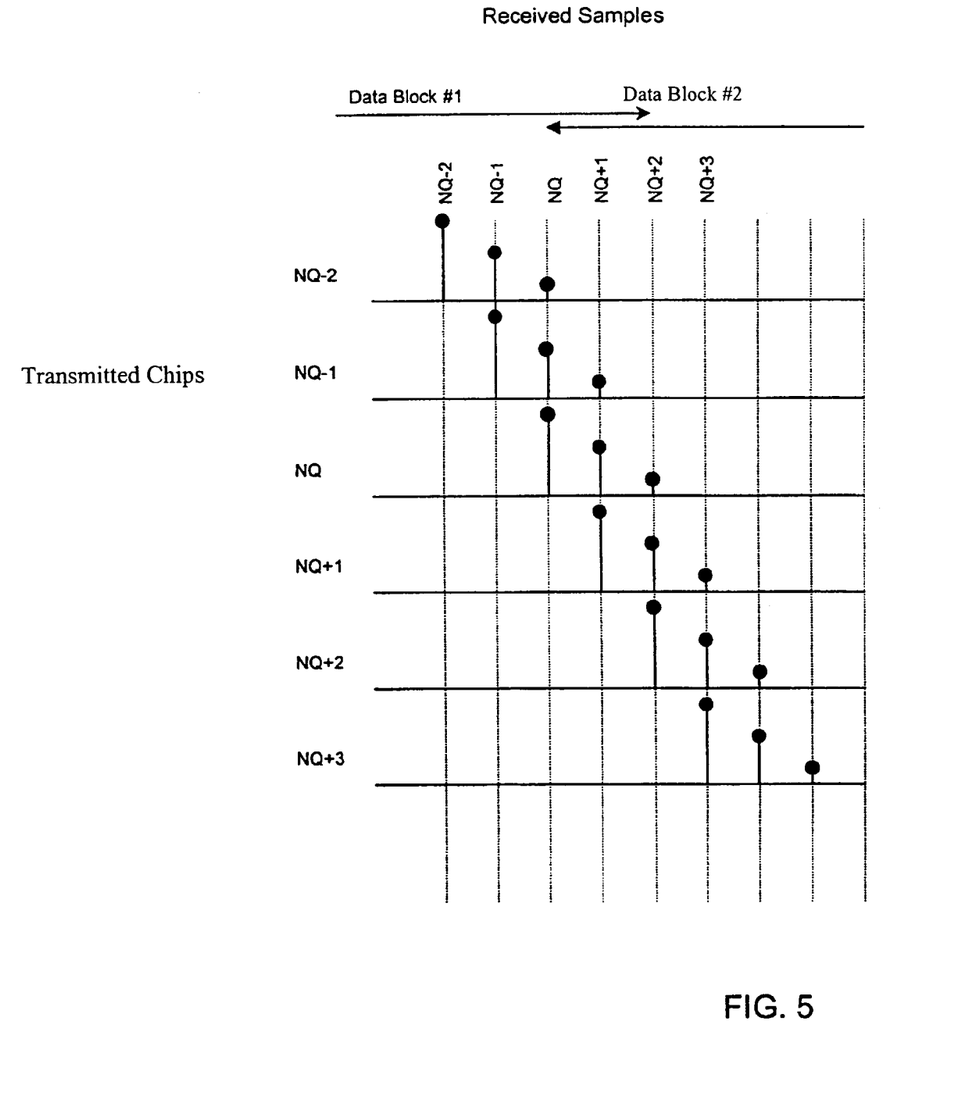
FIG. 5 is a diagram illustrating a problem in the operation illustrated in FIG. 4 absent the improvement of the present invention.

In the diagram of FIG. 5, the overlapping data blocks #1 and #2 of FIG. 4 are illustrated. This diagram shows transmitted chips on the vertical axis against received samples in the data block on the horizontal axis. Here $W_f$ has been made to be 3 so that data block #1 and data block #2 have an overlapping region of $W_f-1$ samples (that is 2). This is illustrated by the overlapping arrows. Specifically, when the $NQ^{th}$ received sample is being processed in the detector, it is clear that the NQ+1 and NQ+2 transmitted chips interfere with the paths of the impulse response in the $NQ^{th}$ received sample. Similarly, the first received sample in data block #2, NQ+1, is interfered by NQ and NQ−1. We can generalize this to $W_f$, such that the last received sample in data block #1 is interfered by the received samples $$NQ+K; K=1, \ldots W_f-1$$

and similarly, data block #2 is interfered by samples $$NQ+K-(W_f-1)$$

For data blocks #2 and #4 the first samples of those blocks are interfered by samples from data blocks #1 and #3 respectively. Since the detector portion of the receiver has incomplete information, and due to smearing, it means that the signal-to-noise ratio for these samples will suffer, and as a consequence the system performance can degrade.

In order to correct the above deficiency or degradation caused by the segmentation and overlap, and still referring to FIG. 5, it can be seen that at $W_f$ samples away from the $NQ^{th}$ sample, since the impulse response has decayed if $(W_f-1)$ samples away are used from the $NQ^{th}$ sample, the influence of the future samples becomes negligible. Therefore, by increasing the size of the data block, but discarding the additional samples after detection, this preserves the improvement in signal-to-noise ratio for the $NQ^{th}$ sample.

For data block #1, the same size of $NQ+W_f-1$ samples is maintained. For data block #2, however, the size is increased to $NQ+2W_f-2$. Obviously this can be generalized for any chip rate using the notation defined above. Note that in FIG. 4 the modification of the data block size is so indicated. In general, depending on the various chip rate parameters and segmentation required, the increase in size may be determined by $M(W_f-1)$, where M is a positive and even integer. Thus, the detector is designed for this increased data block size.

For the purpose of illustration the following example is presented:

Let $W_f=5$, $Q=4$, $N=6$, and consider the following received vector $e_d=(e_1,e_2, \ldots e_{52})$, where $2NQ+W_f-1=52$. Here we only consider the first data block of the burst. Data block #1 is given by $(e_1,e_2,e_3,e_4,e_5,e_6, \ldots e_{28})$ and data block #2 is given by $(e_{21},e_{22},e_{23},e_{24},e_{25},e_{26}, \ldots e_{52})$. The output of the detector for data block 1 is given by $S_1=(S_1,S_2, \ldots S_{24})$ and for data block #2 $S_2=(S_1,S_2, \ldots S_{28})$. Since Q=4, the output of the matched filter produces 6 data symbols for data block #1, so we use $S_1=(S_1,S_2, \ldots S_{24})$. For data block #2, the data post processing removes the first $W_f-1$ chips, as these are samples from the previous spreading code. The resulting vector applied to the post or sample processing unit 21 is given by $S_2=(S_1,S_2, \ldots S_{28})$.

Using the above example, we can generalize the input and output vectors of the detector for A=2. Let $e_d=(e_1,e_2, \ldots e_{2NQ+W_f-1})$ be the input vector to the detector, then the input vectors for the four data blocks are given by $$\#1=(e_1, \ldots e_{NQ+W_f-1})$$

$$\#2=(e_{NQ-W_f+2}, \ldots e_{2NQ+W_f-1})$$

$$\#3=(e_{2NQ+2L_m+1}, \ldots e_{3NQ+2L_m+W_f-1})$$

$$\#4=(e_{3NQ+2L_m-W_f+2}, \ldots e_{4NQ+2L_m+W_f-1})$$

After data post processing, the input vectors to the matched filter are given by $$S_1=(s_1, \ldots s_{NQ})$$

$$S_2=(s_{W_f} \ldots s_{NQ+W_f-1})$$

$$S_3=(s_1, \ldots s_{NQ})$$

$$S_4=(s_{W_f} \ldots s_{NQ+W_f-1})$$

For any A>1, we can generalize the input data blocks and output data blocks of the detector. After segmentation we can write $$\#1=(e_1, \ldots e_{NQ+W_f-1})$$

$$\#2 = (e_{NQ-W_f+2}, \ldots e_{2NQ+W_f-1})$$

$$\vdots$$

$$\# A = (e_{(A-1)NQ-W_f+2}, \ldots e_{ANQ+W_f-1})$$

$$\# A + 1 = (e_{ANQ+AL_m+1}, \ldots e_{(A+1)NQ+AL_m+W_f-1})$$

$$\vdots$$

$$\#2A = (e_{(2A-1)NQ+AL_m-W_f+2}, \ldots e_{2ANQ+AL_m+W_f-1})$$

which yields the set of output vectors of the detector input to matched filter $$S_1=(s_1, \ldots s_{NQ})$$

$$S_2 = (s_{W_f}, \ldots s_{NQ+W_f-1})$$

$$\vdots$$

$$S_A = (s_{W_f}, \ldots s_{NQ+W_f-1})$$

$$S_{A+1} = (s_1, \ldots s_{NQ})$$

$$\vdots$$

$$S_{2A} = (s_{W_f}, \ldots s_{NQ+W_f-1})$$

Finally, we require the block length applied to the detector to be fixed, in order to keep the implementation of the detector consistent throughout. Therefore, we insert $W_f-1$ padding zeros at the beginning of data blocks #1 and #A+1, which gives $$\#1=(0,0, \ldots e_1, \ldots e_{NQ+W_f-1})$$

$$\#A+1=(0,0, \ldots, 0, e_{ANQ+AL_m+1}, \ldots e_{(A+1)NQ+AL_m+W_f-1})$$

This means that all data blocks applied to the detector have a fixed length of $NQ+2W_f-2$, requiring the detector to be suitably modified to accommodate the increased block length.

The output vector after data post processing is given by $$S_i=(s_{W_f} \ldots s_{NQ+W_f-1}); i=1, \ldots 2A$$

Figure 6:
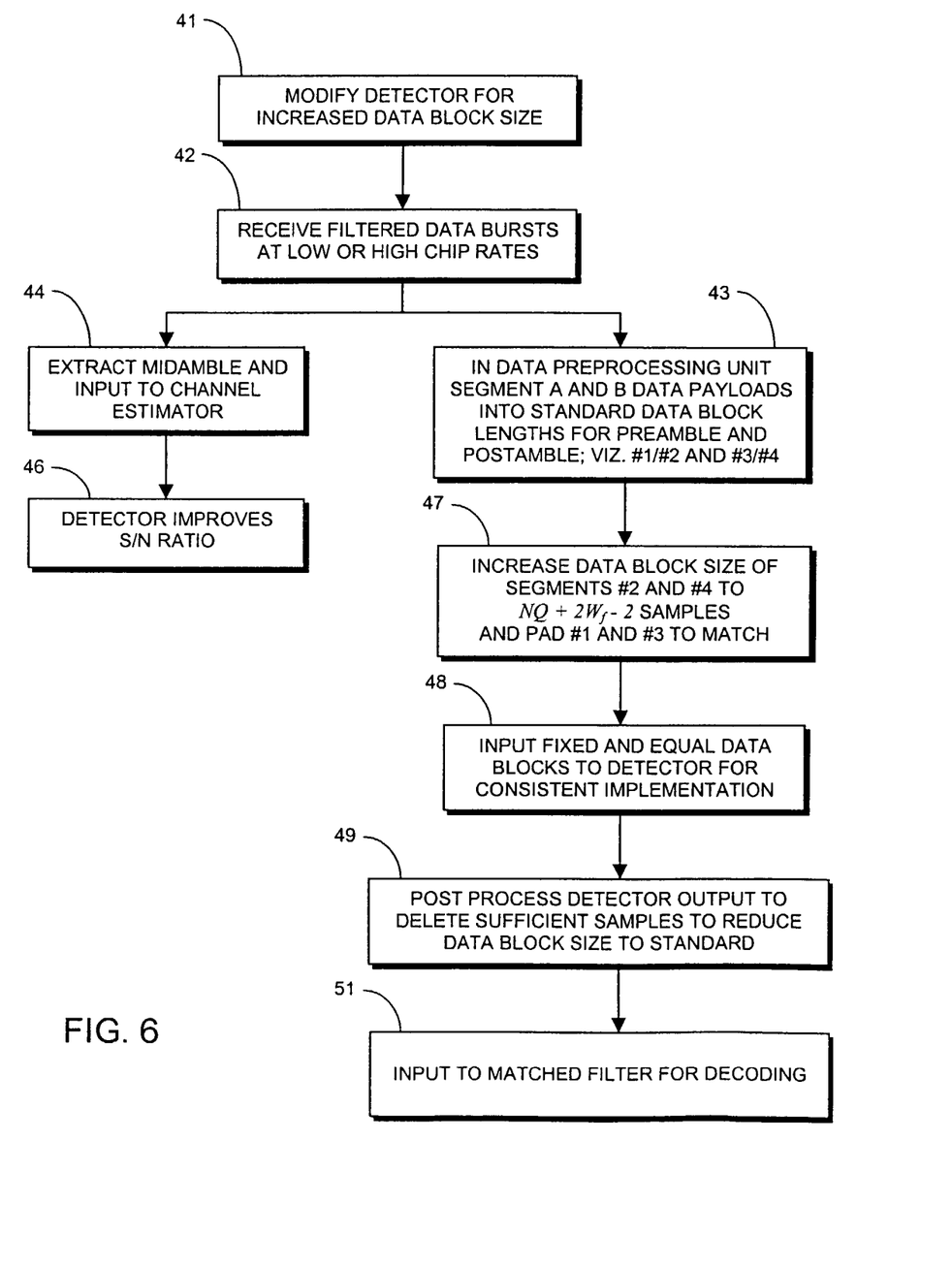
FIG. 6 is a flow chart showing the operation of the present invention.

The operation of the present invention is illustrated in a flow chart at FIG. 6 where in step 41 the detector 18 is modified for the necessary increased data block size to prevent degradation of data. Then in step 42 the data is received which has been filtered and converted as shown in blocks 11 and 12 of FIG. 2. In step 43 in the data preprocessing unit 14 the X and Y data payloads are segmented into standard data block templates with a preamble and postamble (with the midamble in between); that is segment nos. 1 and 2 and 3 and 4. At the same time, the midamble is extracted in step 44 and applied to the detector in step 46 for improved signal-to-noise ratio. And following the main line of the flow chart in step 47, the data block size is increased in segments 2 and 4 to the amount indicated and segments 1 and 3 are padded to match. In step 48 the fixed and equal data blocks are inputted to the detector for detection in a consistent implementation mode. In step 49, the post or pulse process detector output deletes sufficient samples to reduce the data block size to standard which in step 51 is inputted to the matched filter for decoding and then for use in either the user equipment or radio network controller.

Thus, a chip rate invariant detector has been provided which is seamless to changes in chip rate.

What is claimed is:

1. A detector for use in a spread spectrum communications system having at least two different chip rates, said detector comprising:

means for receiving and converting a radio analog signal to digital data bursts;

means for segmenting said digital data bursts into standard data block lengths, for providing a pair of data payloads each with two data block segments where segments within respective data payloads overlap, for increasing a data block size of a first of said two data block segments and for padding a second of said two data block segments to match;

detector means for processing said two data block segments and for accommodating an increased length of said first of said two data block segments to produce a detection signal;

means for post processing said detection signal to reduce a data block length of said first of two data block segments to a standard data block length to produce post processed signals;

matched filter means responsive to said post processed signals for decoding said reduced length data blocks whereby said detector means is invariant to changes in said chip rate and said at least two different chip rates are seamlessly detected.

2. The detector as claimed in claim 1 wherein said at least two different chip rates comprise 3.84 Mcps and 7.68 Mcps chip rates.

3. User equipment for use in a UMTS system, the user equipment including a detector as claimed in claim 1.

4. A node B for use in a UMTS system, the node B including a detector as claimed in claim 1.

5. A spread spectrum high capacity digital wireless communications system incorporating a detector as claimed in claim 1.

6. The system as claimed in claim 5, wherein the system is a UMTS system.

7. The system as claimed in claim 6, wherein the system is a UMTS terrestrial radio access system.

8. A method for detection, in a spread spectrum communications system having at least two different chip rates, said method comprising:

receiving and converting a radio analog signal to digital data bursts;

segmenting said data bursts into standard data block lengths, for providing a pair of data payloads each with two data block segments where segments within respective data payloads overlap, for increasing a data block size of a first of said two data block segments and for padding a second of said two data block segments to match;

detection processing said two data block segments and accommodating an increased length of said first of said two data block segments to produce a detection signal;

post-processing said detection signal to reduce a data block length of said first of two data block segments to a standard data block length to produce post processed signals;

applying matched filtering responsive to said post processed signals for decoding said reduced length data blocks whereby the detection is invariant to changes in said chip rate so that said at least two different chip rates are seamlessly detected.

9. The method as claimed in claim 8, wherein said at least two different chip rates comprise 3.84 Mcps and 7.68 Mcps chip rates.

10. The method as claimed in claim 8, wherein the method is performed in user equipment in a UMTS system.

11. The method as claimed in claim 8, wherein the method is performed in a node B in a UMTS system.

12. The method as claimed in claim 8, wherein the method is performed in a spread spectrum high capacity digital wireless communications system.

13. The method as claimed in claim 12, wherein the system is a UMTS system.

14. The method as claimed in claim 13, wherein the system is a UMTS terrestrial radio access system.

15. A detection system for use in a communications system using a common detector to process signals comprising at least two different chip rates, said detector comprising:

a pre-processing unit comprising an input to accept digital data bursts of non-uniform size and an output to provide standard data blocks derived from the non-uniform sized digital data bursts and from padding data, wherein the standard data blocks comprise blocks of a uniform size and overlapping data;

the common detector comprising an input coupled to the pre-processing unit output and an output to provide a detection signal derived from the standard data blocks, wherein the common detector is invariant to the at least two different chip rates; and a post-processing unit comprising an input coupled to the common detector output to accept the detection signal and an output to provide data blocks of a reduced data block size derived from the standard data blocks.

16. The detection system of claim 15, further comprising:

a receiver comprising an input to accept an analog signal and an output to provide receiver output signals; and a converter comprising an input coupled to the receiver output and an output to provide the digital data bursts derived from the receiver output signals;

wherein the pre-processing unit input couples to the converter output.

17. The detection system of claim 15, further comprising:

a channel estimator comprising an input coupled to an output of the pre-processing unit to accept midamble data and an output coupled to the common detector to provide an estimate of a channel;

wherein the pre-processing unit extracts the midamble.

18. The detection system of claim 15, further comprising a matched filter comprising an input coupled to the output of the post-processing unit to accept the reduced sized data blocks and an output to provide a matched filter output signal.

19. The detector as claimed in claim 15, wherein said at least two different chip rates comprise a first chip rate and a second chip rate wherein a ratio of the first chip rate to the second chip rate comprise a ratio of two positive integers.

20. The detector as claimed in claim 19, wherein the ratio of two positive integers comprise a ratio of 1:2.

21. The detector as claimed in claim 15, wherein the communications system comprises a spread spectrum communications system.

* * * * *